(12) United States Patent
Chun et al.

(10) Patent No.: US 10,402,011 B2
(45) Date of Patent: Sep. 3, 2019

(54) TOUCH SCREEN DISPLAY DEVICE AND DRIVING METHOD THEREOF

(71) Applicant: SAMSUNG DISPLAY CO., LTD., Yongin-si, Gyeonggi-do (KR)

(72) Inventors: Byung Ki Chun, Yongin-si (KR); Joo Hyung Lee, Yongin-si (KR); Won Woo Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 87 days.

(21) Appl. No.: 15/141,683

(22) Filed: Apr. 28, 2016

(65) Prior Publication Data

US 2016/0320916 A1 Nov. 3, 2016

(30) Foreign Application Priority Data

Apr. 30, 2015 (KR) .......................... 10-2015-0061490

(51) Int. Cl.
*G06F 3/041* (2006.01)
*G09G 3/00* (2006.01)

(52) U.S. Cl.
CPC .......... *G06F 3/0418* (2013.01); *G06F 3/0412* (2013.01); *G09G 3/007* (2013.01);
(Continued)

(58) Field of Classification Search
USPC ................. 345/173, 660, 591, 77, 174, 156; 715/773, 211; 348/231.2, 220.1
See application file for complete search history.

(56) References Cited

U.S. PATENT DOCUMENTS

| 6,992,661 B2 * | 1/2006 | Ikehata ............... G06F 3/04845 345/173 |
| 2008/0111886 A1 | 5/2008 | Bai |

(Continued)

FOREIGN PATENT DOCUMENTS

| EP | 0 030 160 A2 | 6/1981 |
| EP | 3046011 A2 | 7/2016 |
| KR | 10-2016-0077510 A | 7/2016 |

OTHER PUBLICATIONS

EPO Extended Search Report dated Aug. 18, 2016, for corresponding European Patent Application No. 16167776.0 (9 pages).

(Continued)

*Primary Examiner* — Thuy N Pardo
(74) *Attorney, Agent, or Firm* — Lewis Roca Rothgerber Christie LLP

(57) ABSTRACT

A touch screen display device includes: an image corrector for converting first image data for displaying on pixels to second image data for displaying on the pixels, and for generating a lookup table based on the conversion; and a processor for correcting second touch positions based on the second image data to first touch positions based on the first image data using the lookup table. A method of driving a touch screen display device includes converting first image data for displaying on pixels to second image data for displaying on the pixels, generating a lookup table based on the conversion, and correcting second touch positions based on the second image data to first touch positions based on the first image data by using the lookup table.

18 Claims, 10 Drawing Sheets

(52) U.S. Cl.
CPC ............... *G09G 2320/0257* (2013.01); *G09G 2320/0285* (2013.01)

(56) References Cited

U.S. PATENT DOCUMENTS

| | | | | |
|---|---|---|---|---|
| 2009/0153700 | A1* | 6/2009 | Po-Jung | H04N 5/77 348/231.2 |
| 2010/0085316 | A1* | 4/2010 | Kim | G06F 1/1616 345/173 |
| 2011/0102614 | A1* | 5/2011 | Juen | H04N 1/0044 348/220.1 |
| 2012/0038791 | A1* | 2/2012 | Po-Jung | H04N 5/77 348/231.2 |
| 2012/0307095 | A1* | 12/2012 | Juen | H04N 1/0044 348/220.1 |
| 2013/0063384 | A1* | 3/2013 | Ito | G01C 21/3664 345/173 |
| 2014/0043281 | A1 | 2/2014 | Kim et al. | |
| 2014/0063041 | A1* | 3/2014 | Jang | G09G 5/02 345/591 |
| 2014/0111454 | A1* | 4/2014 | Hosoi | H04M 1/72527 345/173 |
| 2014/0118282 | A1 | 5/2014 | Wen et al. | |
| 2014/0218320 | A1* | 8/2014 | Liu | G06F 3/0418 345/173 |
| 2014/0285421 | A1* | 9/2014 | Colakoglu | G06F 3/002 345/156 |
| 2015/0135120 | A1* | 5/2015 | Tanaka | G06F 3/04886 715/773 |
| 2015/0222673 | A1* | 8/2015 | Suzuki | G06F 3/0488 715/211 |
| 2015/0268476 | A1* | 9/2015 | Nonaka | G02B 27/0179 345/660 |
| 2016/0179269 | A1 | 6/2016 | Chun et al. | |
| 2018/0197506 | A1* | 7/2018 | Colakoglu | G09G 5/12 345/173 |

OTHER PUBLICATIONS

European Office Action for corresponding European Application No. 16 167 776.0, dated Apr. 11, 2019, 7 pages.

\* cited by examiner

| the first pixel group | the first touch position | the second pixel group | the second touch position |
|---|---|---|---|
| PG1 | (X1, Y1) | SPG1 | (Xn-1, Ym-1) |
| PG2 | (X2, Y1) | SPG2 | (Xn, Ym-1) |
| PG3 | (X1, Y2) | SPG3 | (Xn-1, Ym) |
| PG4 | (X2, Y2) | SPG4 | (Xn, Ym) |
| ⋮ | ⋮ | ⋮ | ⋮ |

LUT

| the first pixel group | the second pixel group |
|---|---|
| Z1 | Zn-k |
| Z2 | Zn-k+1 |
| Zk | Zn-1 |
| Zk+1 | Zn |
| ⋮ | ⋮ |

TOUCH SCREEN DISPLAY DEVICE AND DRIVING METHOD THEREOF

CROSS-REFERENCE TO RELATED APPLICATION

This application claims priority to and the benefit of Korean Patent Application No. 10-2015-0061490, filed on Apr. 30, 2015 in the Korean Intellectual Property Office, the entire content of which is incorporated herein by reference.

BACKGROUND

1. Field

Aspects of embodiments of the present invention relate to a touch screen display device and a driving method of the touch screen display device.

2. Description of the Related Art

Recently, various types of flat panel displays, such as organic light emitting displays, liquid crystal display devices, and plasma display devices, have achieved widespread use. However, particular pixels of these display devices may deteriorate due to long-term use, which may cause afterimages or other image quality degradation. For example, a public digital information display device may keep displaying a predetermined image or text for a long time, which may lead to or accelerate the deterioration of particular pixels and may cause afterimages.

SUMMARY

Aspects of embodiments of the present invention are directed toward a touch screen display device having increased touch detection accuracy according to a user's intended touch operation and reduced time delay to detect an accurate touch position, and toward a driving method of such a touch screen display device.

According to an embodiment of the present invention, a touch screen display device is provided. The touch screen display device includes: an image corrector for converting first image data for displaying on pixels to second image data for displaying on the pixels, and for generating a lookup table based on the conversion; and a processor for correcting second touch positions based on the second image data to first touch positions based on the first image data using the lookup table.

The image corrector may include an image converter for converting the first image data to the second image data by using one or more control signals received from the processor and for generating pixel shift information relating the second image data to the first image data, and a lookup table generator for defining positional relationships between the first touch positions and the second touch positions by using the pixel shift information and for generating a lookup table according to the defined positional relationships.

The image converter may be configured to generate from an X-coordinate and a Y-coordinate with respect to the first image data a converted X-coordinate and a converted Y-coordinate of the second image data by converting the X-coordinate and the Y-coordinate in response to the control signals, and calculate an X-axis shift amount between the X-coordinate and the converted X-coordinate and a Y-axis shift amount between the Y-coordinate and the converted Y-coordinate.

The pixel shift information may include the X-axis shift amount and the Y-axis shift amount.

The lookup table generator may be configured to divide the pixels in a sequential manner into pixel groups each including at least one pixel.

The lookup table generator may be further configured to: divide the pixels into X-axis pixel groups in a horizontal direction and into Y-axis pixel groups in a vertical direction, each including at least one pixel; and generate X-axis touch coordinates and Y-axis touch coordinates corresponding to the X-axis pixel groups and the Y-axis pixel groups, respectively. The first touch positions and the second touch positions may each include one of the X-axis touch coordinates and one of the Y-axis touch coordinates.

The lookup table generator may be configured to generate first pixel groups corresponding to the first image data and second pixel groups corresponding to the second image data and set touch positions of the first pixel groups to the first touch positions and touch positions of the second pixel groups to the second touch positions.

The lookup table may be configured to associate the first pixel groups to the first touch positions and the second pixel groups to the second touch positions on a display panel.

The image corrector may be configured to generate the lookup table whenever the conversion between the first image data and the second image data changes.

The image corrector may be configured to generate the lookup table periodically.

The lookup table generator may be further configured to divide the pixels sequentially into the pixel groups in a first direction and to define an ordering of the pixel groups according to the sequential division order.

The first direction may be one of a row major order and a column major order on a display panel.

According to another embodiment of the present invention, a method of driving a touch screen display device is provided. The method includes converting first image data for displaying on pixels to second image data for displaying on the pixels, generating a lookup table based on the conversion, and correcting second touch positions based on the second image data to first touch positions based on the first image data by using the lookup table.

The converting of the first image data may include generating from an X-coordinate and a Y-coordinate with respect to the first image data a converted X-coordinate and a converted Y-coordinate of the second image data by converting the X-coordinate and the Y-coordinate in response to one or more control signals, and generating the second image data by mapping the first image data to converted coordinates including the converted X-coordinate and the converted Y-coordinate.

The converting of the second image data may include dividing the pixels in a sequential manner into pixel groups each including at least one pixel, and assigning the first and second touch positions to the pixel groups. The lookup table may include the first and second touch positions assigned to the pixel groups.

The dividing of the pixels may include dividing the pixels horizontally into X-axis pixel groups and vertically into Y-axis pixel groups on a display panel, and classifying pixel groups commonly included in the X-axis pixel groups and the Y-axis pixel groups.

The dividing of the pixels may include dividing the pixels in one of a row major order and a column major order on a display panel into the pixel groups.

The assigning of the first and second touch positions may include assigning X-axis touch coordinates and Y-axis touch coordinates corresponding to the X-axis pixel groups and the Y-axis pixel groups, respectively. The classifying of the pixel groups may include classifying the pixel groups by using the X-axis touch coordinates and the Y-axis touch coordinates.

The generating of the lookup table may include generating first pixel groups corresponding to the first touch positions and second pixel groups corresponding to the second touch positions, and setting touch positions of the first pixel groups to the first touch positions and setting touch positions of the second pixel groups to the second touch positions to generate the lookup table.

The lookup table may be configured to associate the first pixel groups to the first touch positions and the second pixel groups to the second touch positions on a display panel.

DETAILED DESCRIPTION

Figure 1:
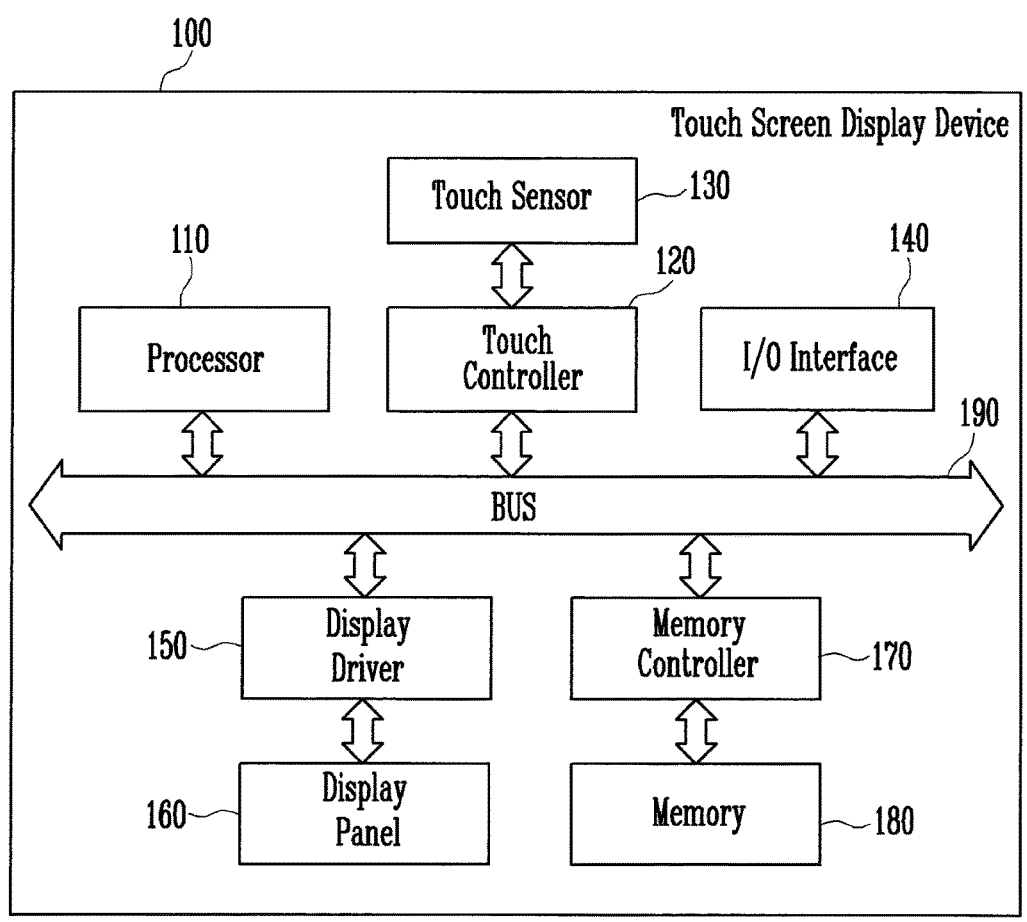
FIG. 1 is a block diagram of an example touch screen display device according to an embodiment of the present invention.

Example embodiments of the present invention will now be described more fully hereinafter with reference to the accompanying drawings. However, the present invention may be embodied in different forms and should not be construed as being limited to the embodiments set forth herein. Rather, these embodiments are provided to more fully convey the spirit and scope of the present invention to those skilled in the art.

Because embodiments of the present invention may be variously modified and have various forms, specific embodiments are illustrated in the drawings and described in the detailed description. However, it should be understood that the present invention is not limited to the specific embodiments. For example, the present invention further includes all changes, equivalents, or alternatives to any illustrated or described embodiments that are in the spirit and technical scope of the present invention as would be apparent to one of ordinary skill.

In the description of respective drawings, the same or similar reference numerals designate the same or similar elements. Further, in the accompanying drawings, the dimensions, sizes, and proportions of structures may be exaggerated compared to the actual dimensions, sizes, and proportions for clarity of illustration. In addition, when an element is referred to as being "between" two elements, the element may be the only element present between the two elements, or one or more intervening elements may also be present. Like reference numerals refer to like elements throughout.

Terms such as "first," "second," and the like may be used for describing various constituent elements, but the constituent elements should not be limited by these terms. The terms are used mainly to differentiate one constituent element from another constituent element. For example, a first element may be termed a second element, and similarly, a second element may be termed a first element, all without departing from the scope of the present invention. Singular expressions used herein include the corresponding plural expressions unless clearly indicated to the contrary.

It will be understood that when an element or layer is referred to as being "on," "connected to," "coupled to," or "adjacent to" another element or layer, it may be directly on, connected to, coupled to, or adjacent to the other element or layer, or one or more intervening elements or layers may also be present. By contrast, when an element or layer is referred to as being "directly on," "directly connected to," "directly coupled to,", or "immediately adjacent to" another element or layer, there are no intervening elements or layers present.

In the present disclosure, it will be appreciated that the terms "including" and "having" are intended to designate the existence of characteristics, numbers, steps, operations, constituent elements, components, and combinations thereof described in the specification, and do not exclude the possibility of the existence or addition of one or more other specific characteristics, numbers, steps, operations, constituent elements, components, or combinations thereof. It will be understood that when an element such as a layer, film, region, or substrate is referred to as being "on" another element, it may be directly on the other element or intervening elements may also be present. In addition, it will be understood that when an element such as a layer, film, region, or substrate is referred to as being "beneath" another element, it may be directly beneath the other element or intervening elements may also be present.

The electronic or electric devices and/or any other relevant devices or components according to embodiments of the present invention described herein may be implemented utilizing any suitable hardware, firmware (e.g., an application-specific integrated circuit (ASIC)), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

In addition, the various components of these devices may be a process or thread, running on one or more computer processors (such as microprocessors), in one or more computing devices, executing computer program instructions and interacting with other system components for performing the various functionalities described herein. The computer program instructions may be stored in a memory that may be implemented in a computing device using a standard memory device such as random access memory (RAM). The computer program instructions may also be stored in other, non-transitory, computer readable media such as, for example, a CD-ROM, flash drive, or the like.

Further, a person of skill in the art should recognize that the functionality of various computing devices may be combined or integrated into a single computing device, or the functionality of a particular computing device may be distributed across one or more other computing devices without departing from the spirit and scope of the present invention.

Furthermore, unless defined otherwise, all the terms used in this specification, including technical and scientific terms, have the same meanings as would be generally understood by those skilled in the related art. Further, unless clearly defined otherwise in this specification, terms should not be construed as having idealistic or overly formal meanings from their definitions provided in generally used dictionaries.

In touch screen display devices, to address concerns such as avoiding the deterioration of pixels, pixel shifting may be used to move an image being displayed on one portion of a display panel to another portion of the display panel. For example, when the image is moved (such as periodically moved) and displayed on different portions of the display panel, it may be possible to prevent the same data from being output to the same pixels for long periods of time, so that deterioration of particular pixels may be avoided. Pixel shifting may be performed independent of, and subsequent to, normal image processing, such that most of the components of the touch screen display device (including the touch sensor hardware and the components to which the touch sensor hardware provides touch detection data) are unaware of the pixel shifting.

A touch screen function may be added to display devices for convenient interactions with a user. For example, the display device may include a touch sensor, such as a capacitive touch sensor, a resistive touch sensor, or an optical touch sensor, to detect a touch position by the user. Touch sensors may be driven by hardware that performs somewhat independently of the display panels and their image displaying hardware. For example, when a touch sensor detects a touch at a particular location of the display panel, the touch sensor hardware (e.g., electrodes) may be formed in separate layers of the display panel and managed by different components of the touch screen display device than the display hardware (e.g., electrodes) used to display an image at the same location of the display panel.

Accordingly, when a touch screen display device having touch sensors uses pixel shifting technology, the user may carry out a touch operation after seeing an image that has been moved or shifted in a particular direction from a first location to a second location. However, the touch sensor hardware of the display device may be unaware of this pixel shifting, such that when the user touches the image at the second location (after the intended touch position shifts from the first location to the second location), the touch position is detected as the second location without considering the movement or shifting of the image from the first location to the second location. As such, a different actual touch position (e.g., the second location) from the position the user intends to select (e.g., the first location) may be detected in error.

Further, a process for correcting the detected touch position (e.g., the second location) to a user's desired touch position (e.g., the first location) may cause noticeable time delay (for example, if the entire image and corresponding touch positions have to be remapped on a pixel-by-pixel basis after pixel shifting to their corresponding positions before pixel shifting). To address these and other concerns, hereinafter, example embodiments of the present invention are described in further detail with reference to the accompanying drawings.

FIG. 1 is a block diagram of an example touch screen display device 100 according to an embodiment of the present invention.

Referring to FIG. 1, the touch screen display device 100 may perform a task in response to a touch operation that is detected on a display panel 160. The touch screen display device 100 may include a processor 110, a touch sensor 130, a touch controller 120, an input/output interface 140, a display driver 150, the display panel 160, a memory controller 170, a memory 180, and a bus 190. The touch screen display device 100 may be, for example, a cellular phone, a smart phone, a personal digital assistant (PDA), an enterprise digital assistant (EDA), a digital still camera, a digital video camera, a portable multimedia player (PMP), a personal navigation device or a portable navigation device (PND), a mobile internet device (MID), a wearable computer, an organic light emitting display device, a liquid crystal display device, a plasma display device, or a quantum dot display device.

The processor 110 may perform set or predetermined calculations or tasks. For example, the processor 110 may be one or more of an integrated circuit (IC), an application processor (AP), a mobile AP, or a processor (such as a graphics processor) capable of controlling operations of the display driver 150.

The touch sensor 130 may sense user's movements and convert the movements to electrical signals. The touch sensor 130 may be configured to detect a touch that is input by a user, generate a touch signal, and supply the touch signal to the touch controller 120. The touch sensor 130 may sense a touch that is input, for example, by the user's body part (e.g., the user's finger) or physical tool under the user's control (such as a stylus pen). In other embodiments, a touch may be input by the user not only by directly touching the touch screen display device 100 with a user's finger or the like, but also by placing the finger near the touch screen display device 100.

The touch sensor 130 may be, for example, a capacitive type touch sensor, a resistive type touch sensor, an optical touch sensor, a surface acoustic wave touch sensor, a pressure touch sensor, or a hybrid touch sensor, and may be implemented as part of (for example, a separate layer on top of) the display panel 160. However, the touch sensor 130 is not limited thereto.

The touch controller 120 may detect a position at which the touch is generated by using the touch signals supplied from the touch sensor 130. In addition, the touch controller 120 may transmit the detected touch position to the processor 110. According to some embodiments, the touch sensor 130 may be separated from the display panel 160. According to other embodiments, the touch sensor 130 may be incorporated into the display panel 160.

The input/output interface 140 may input signals to the processor 110 from an input device connected to the touch screen display device 100. The input device may be, for example, a keyboard, a mouse, a microphone, or a touchpad.

The display panel 160 may include a plurality of pixels and may display an image thereon by using image data that is input from the processor 110. The display panel 160 may be, for example, an organic light emitting display panel, a liquid crystal display panel, or a plasma display panel. The display driver 150 may control an image displaying operation of the display panel 160 by supplying driving signals to the display panel 160.

The memory 180 may store image data supplied from the processor 110. The memory 180 may be, for example: a non-volatile memory, such as electrically erasable programmable read-only memory (EEPROM), flash memory, magnetic RAM (MRAM), spin-transfer torque MRAM (MRAM), ferroelectric RAM (FeRAM), phase change RAM (PRAM), or resistive RAM (RRAM); or a volatile memory, such as random access memory (RAM), static RAM (SRAM), dynamic RAM (DRAM), synchronous DRAM (SDRAM), thyristor RAM (T-RAM), zero capacitor RAM (Z-RAM), or Twin Transistor RAM (TTRAM).

The memory controller 170 may write image data to the memory 180 in response to a write request output from the processor 110 or read the image data from the memory 180 in response to a read request.

The processor 110, the touch controller 120, the input/output interface 140, the display driver 150, and the memory controller 170 may communicate with each other through the bus 190. The bus 190 may be, for example, a Peripheral Component Interconnect (PCI) bus, a PCI Express bus, an Advanced Microcontroller Bus Architecture bus (AMBA), an advanced high performance bus (AHB), an advanced peripheral bus (APB), an AXI bus, or a combination thereof.

Figure 2:
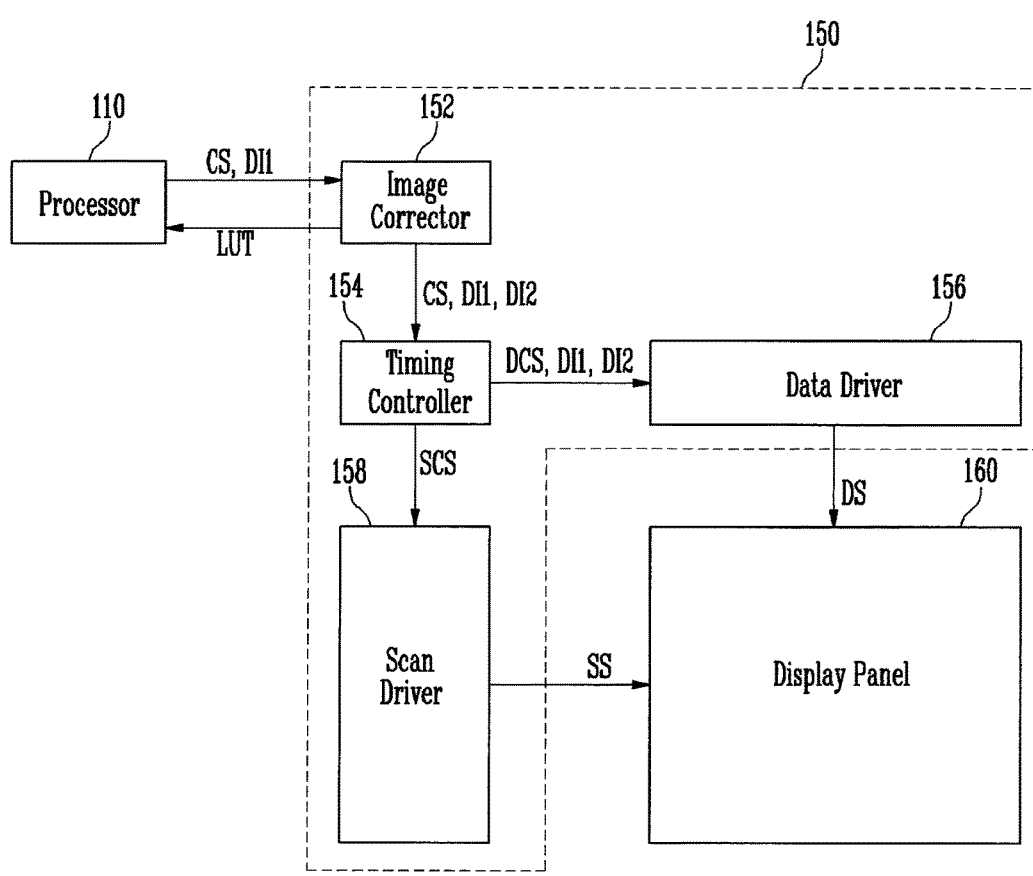
FIG. 2 is a block diagram of an example processor, display driver, and display panel of the touch screen display device of FIG. 1 according to an embodiment of the present invention.

FIG. 2 is a block diagram of an example processor 110, display driver 150, and display panel 160 of the touch screen display device 100 of FIG. 1 according to an embodiment of the present invention.

Referring to FIG. 2, the processor 110 may supply first image data DI1 (e.g., an intended image) and control signals CS (e.g., synchronization signals) to the display driver 150 and control a sensed touch position by using a lookup table LUT (e.g., for correcting an actual sensed touch position to an intended touch position) received from the display driver 150. The display driver 150 may include an image controller (or image corrector) 152, a timing controller 154, a scan driver 158, and a data driver 156.

The image controller (or image corrector) 152 may generate second image data DI2 (for example, remapped image data, actual image data, shifted image data) by using the first image data DI1 (e.g., intended image data) and the control signals CS supplied from the processor 110. In addition, the image controller 152 may transfer one or more of the first image data DI1, the second image data DI2, and the control signals CS to the timing controller 154. According to another embodiment, the image controller 152 may directly supply one or more of the first image data DI1, the second image data DI2, and the control signals CS to the data driver 156 and not through the timing controller 154.

The image controller 152 may generate the lookup table LUT including touch positions corresponding to the second image data DI2, the lookup table LUT representing an inverse of the pixel shifting or other remapping of the first image data DI1 to the second image data DI2. The image controller 152 may transfer the generated lookup table LUT to the processor 110 so that, for example, the processor 110 may continue to work with the first image data DI1 (e.g., the intended image) by using the lookup table LUT to correct data (such as touch sensor data) that may be affected by the pixel shifting (or other remapping) of the image controller 152 on the first image data DI1.

According to other embodiments, the image controller 152 may be separated from the display driver 150. According to still other embodiments, the image controller 152 may be incorporated into the timing controller 154, and the timing controller 154 may convert the first image data DI1 to the second image data DI2.

The timing controller 154 may receive one or more of the first image data DI1, the second image data DI2, and the control signals CS from the image controller 152. The timing controller 154 may generate timing control signals to control the scan driver 158 and the data driver 156 based on the control signals CS. The timing control signals may include, for example, scan timing control signals SCS to control the scan driver 158 and data timing control signals DCS to control the data driver 156. The timing controller 154 may supply the scan timing control signals SCS to the scan driver 158 and the data timing control signals DCS to the data driver 156.

The timing controller 154 may display a first image by supplying the first image data DI1 to the data driver 156 during a first period (such as a normal period for driving the display panel 160 with the normal image data) and a second image by supplying the second image data DI2 to the data driver 156 during a second period (such as a remapping period or pixel shifting period for driving the display panel 160 with remapped image data). The image controller 152 may supply only one of the first image data DI1 and the second image data DI2 to the timing controller 154 during a frame (for displaying the image data), for example, using the same signal lines to supply either set of image data. As such, the timing controller 154 may not even be aware that the image data being displayed has been remapped (e.g., the second image data DI2) from the intended image data (e.g., the first image data DI1).

The data driver 156 may receive the data timing control signals DCS and one or more of the first and second image data DI1 and DI2 from the timing controller 154 to generate data signals DS. In addition, the data driver 156 may supply the generated data signals DS to data lines that may be connected to the pixels. The data driver 156 may be electrically connected to the data lines located in the display panel 160 through a separate component. According to another embodiment, the data driver 156 may be directly mounted on the display panel 160.

The scan driver 158 may supply scan signals SS to scan lines in response to the scan timing control signals SCS. The scan driver 158 may be electrically connected to the scan lines SS (that may be connected to the pixels) located in the display panel 160. According to another embodiment, the scan driver 158 may be directly mounted on the display panel 160.

The pixels of the display panel 160 may receive respective ones of the data signals DS through the data lines when respective ones of the scan signals SS are supplied through the scan lines, and may emit light with brightness corresponding to the received data signals DS. For example, when the timing controller 154 or the image controller 152 supplies the first image data DI1 to the data driver 156, the data driver 156 may display the first image by supplying the data signals DS corresponding to the first image data DI1 to the pixels. In a similar fashion, when the timing controller 154 or the image controller 152 supplies the second image data DI2 to the data driver 156, the data driver 156 may display the second image by supplying the data signals DS corresponding to the second image data DI2.

The data driver 156 may be separated from the scan driver 158. According to other embodiments, the data driver 156 may be incorporated into the scan driver 158, the scan driver 158 may be incorporated into the data driver 156, or the scan driver 158 and the data driver 156 may integrated on a common chip or circuit.

Figure 3:
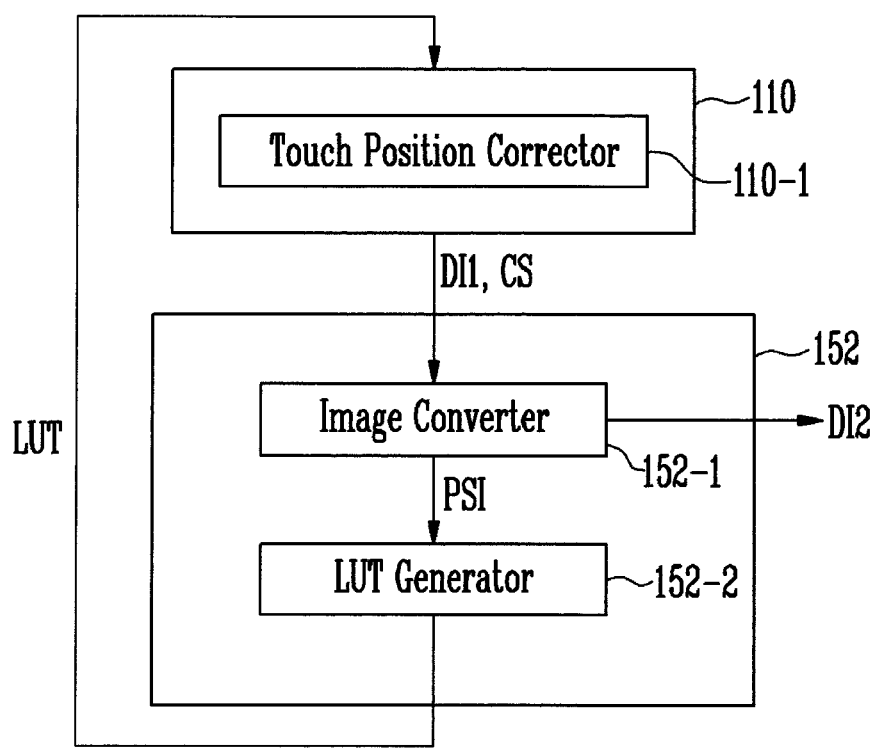
FIG. 3 is a block diagram illustrating an example data flow between the processor and an image corrector of the display driver of FIG. 2 according to an embodiment of the present invention.

FIG. 3 is a block diagram illustrating an example data flow between the processor 110 and the image controller 152 of FIG. 2.

Referring to FIG. 3, the image controller 152 may include an image converter 152-1 and a lookup table generator 152-2. The image converter 152-1 may convert the first image data DI1 (e.g., the intended image) to the second image data DI2 (e.g., the actual or remapped image) by performing a pixel shift operation to move and display an image. For example, image converter 152-1 may move the first image data DI1 on the display panel 160 at regular or irregular periods (such as periodically) to reduce or prevent afterimages. Further, the image converter 152-1 may perform this image data conversion without any other component of the touch screen display device 100 (such as the touch sensor 130 and touch controller 120) being aware of the conversion.

In addition, the image converter 152-1 may, for example, reduce or prevent the generation of afterimages by moving the first image data DI1 with or without set or predetermined directionality. Furthermore, embodiments of the present invention are not limited by the reasons for the conversion of the first image data DI1 to the second image data DI2 or the implementation of the conversion. An example method by which the image converter 152-1 converts the first image data DI1 to the second image data DI2 is described below in further detail with reference to FIG. 4; however, this is but one possible embodiment, and other embodiments are not limited thereto.

The image converter 152-1 may transfer the second image data DI2 to the timing controller 154 (for example, in place of transferring the first image data DI1). In addition, the image converter 152-1 may generate pixel shift information PSI indicating, for example, a distance and a direction by which an image is moved (e.g., a distance and direction between the first pixels displaying the first image data DI1 and the corresponding second pixels displaying the second image data DI2).

Referring to FIG. 2, it is assumed that the X-axis represents a horizontal axis of the display panel 160, the Y-axis represents a vertical axis of the display panel 160, and the X-axis is perpendicular to the Y-axis. The image converter 152-1 may represent the first pixels and the second pixels using X-coordinates and Y-coordinates.

The pixel shift information PSI may include, for example, an X-axis shift amount and a Y-axis shift amount. The X-axis shift amount may refer to the distance by which the second pixels are separated from the corresponding first pixels in an X-axis (e.g., horizontal) direction, and the Y-axis shift amount may refer to the distance by which the second pixels are separated from the first pixels in a Y-axis (e.g., vertical) direction.

Referring again to FIG. 3, the lookup table generator 152-2 may generate the lookup table LUT by using the pixel shift information PSI generated by the image converter 152-1. For example, when the first image data DI1 is converted to the second image data DI2 by the image converter 152-1, an inverse of the same operation (e.g., the same distance but in the opposite direction) may be performed to correct a second touch position when the user touches a second (or actual) touch position (corresponding to the second image data DI2) to a first touch position when the user touches a first (or intended) touch position (corresponding to the first image data DI1 before the conversion).

For convenience of explanation, a touch position corresponding to the first pixels where the first image data DI1 is displayed may be referred to as the first (or intended) touch position, and a corresponding touch position corresponding to the second pixels where the second image data DI2 is displayed may be referred to as the second (or actual) touch position. Thus, the portion of the image at the first touch position of the first image data DI1 may correspond to the same portion of the image at the second touch position of the second image data DI2.

The lookup table generator 152-2 may generate the lookup table LUT by using the pixel shift information PSI so that other components (such as the processor 110) may correct the second (e.g., actual) touch position to the first (e.g., intended) touch position. Accordingly, other components (such as the processor 110) may need only use the lookup table LUT to recover from side effects of the pixel shifting performed by the image converter 152-1 and without having to be aware of any of the details of the pixel shifting. The lookup table generator 152-2 may generate the lookup table LUT including the second touch positions and their corresponding first touch positions.

According to one or more embodiments, the lookup table generator 152-2 may generate the lookup table LUT using pixel groups (each including a plurality of pixels) in order to reduce, for example, the size or arithmetic complexity of generating the lookup table LUT, where such a lookup table LUT may be used to collectively correct touch positions of all of the pixels included in each of the pixel groups in a single correction versus a separate correction for each of the pixels.

The lookup table generator 152-2 may generate the lookup table LUT to correct the second (e.g., actual) touch positions to the corresponding first (e.g., intended) touch positions. The lookup table generator 152-2 may generate the lookup table LUT by using the pixel shift information PSI whenever the image converter 152-1 changes techniques for converting the first image data DI1 to the second image data DI2. For example, the lookup table generator 152-2 may generate the lookup table LUT at each set or predetermined period when the image converter 152-1 changes from shifting the pixels using a first distance and a first direction to using a second distance and a second direction.

The image controller 152 may transfer the lookup table LUT generated by the lookup table generator 152-2 to the processor 110. In turn, the processor 110 may include a touch position corrector 110-1 that corrects a touch position according to a pixel shift operation. The touch position corrector 110-1 may correct the second touch position to the first touch position by using the lookup table LUT received from the image controller 152.

The lookup table LUT may include information about the pixel groups and information necessary or useful in correcting the touch position of each pixel group. Therefore, the touch position corrector 110-1 may collectively correct touch positions corresponding to second (e.g., actual) pixel groups into corresponding touch positions corresponding to first (e.g., intended) pixel groups, so that it may be unnecessary to calculate a corrected touch position corresponding to each pixel.

Figure 4:
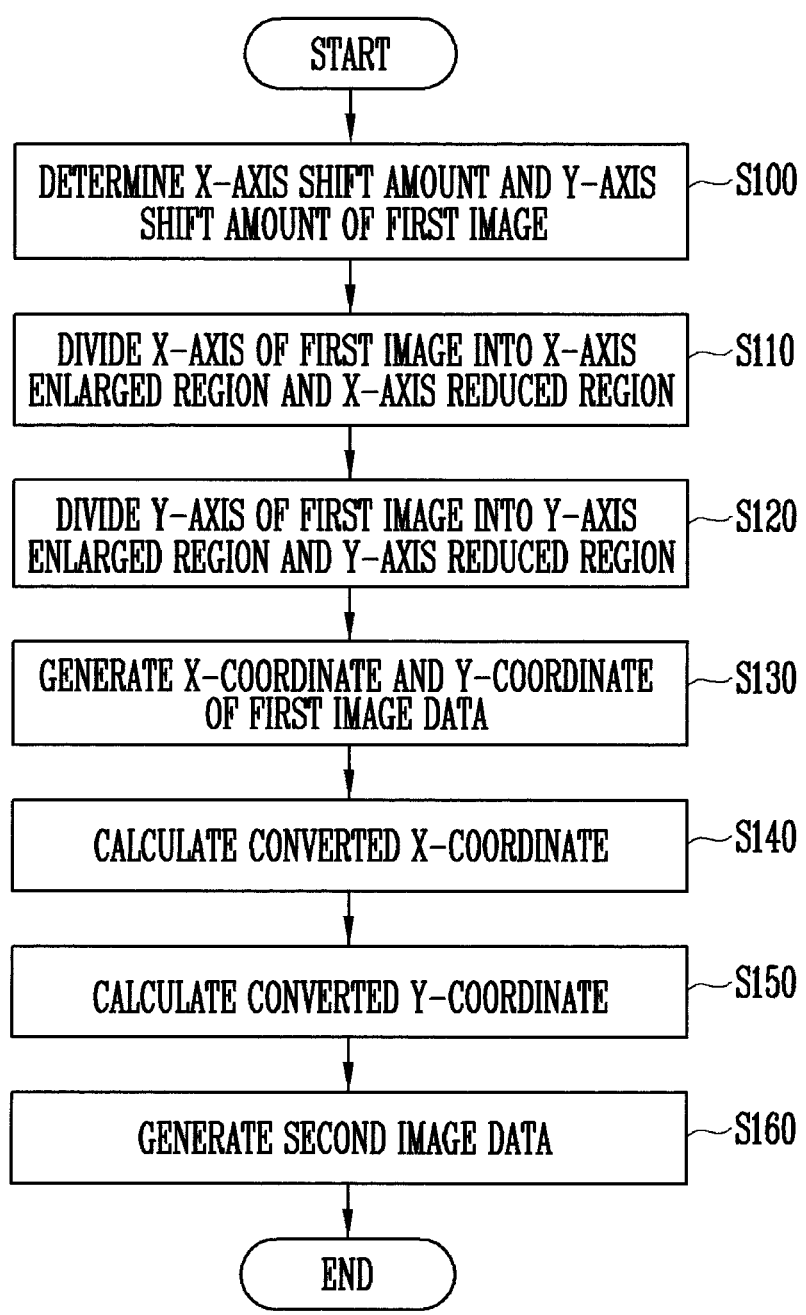
FIG. 4 is a flowchart illustrating an example pixel shift operation of an image converter of the image corrector of FIG. 3 according to an embodiment of the present invention.

FIG. 4 is a flowchart illustrating an example pixel shift operation of the image converter 152-1 of FIG. 3 according to an embodiment of the present invention.

The image converter 152-1 may determine an X-axis shift amount and a Y-axis shift amount (S100). The technique for converting the first pixel data DI1 to the second pixel data DI2 may be done in any number of ways. For example, each first pixel before shifting may be mapped to a corresponding second pixel after shifting by selecting a shift distance and a shift direction, which would then yield the X-axis shift amount and the Y-axis shift amount. Edge or peripheral pixels may be handled by, for example, replicating nearby pixel data, filling in with a consistent background color or scheme, or wrapping around the display panel.

The X-axis shift amount may refer to the distance by which the second pixels (e.g., after shifting) are separated from the first pixels (e.g., before shifting) in the X-axis direction, and the Y-axis shift amount may refer to the distance by which the second pixels are separated from the first pixels in the Y-axis direction. The X-axis may represent a horizontal axis of the display panel 160, and the Y-axis may represent a vertical axis of the display panel 160 that is perpendicular to the X-axis.

For example, the first image data DI1 may be read one pixel at a time to generate the X-coordinate and the Y-coordinate along with their corresponding image data of the next first image pixel data (S130). Then the converted X-coordinate may be calculated by applying the X-axis shift amount to the next X-coordinate (S140) and the converted Y-coordinate may be calculated by applying the Y-axis shift amount to the next Y-coordinate (S150), at which point the corresponding second image data DI2 for the second pixel (with the converted X- and Y-coordinates) can be set as the same data in the first image data DI1 with the original X- and Y-coordinates. Repeating this process for each pixel may generate the second image data DI2 (S160).

The first image data DI1 may be converted to the second image data DI2 in units of frames (e.g., consecutive screen shot images). For example, one pixel shift distance and direction may be used for a number of frames, and then a different pixel shift distance and direction used for a following number of frames. The image converter 152-1 may determine the X-axis shift amount and the Y-axis shift amount based on a vertical synchronization signal of the control signals CS (which may separate image data from one frame to the next).

However, the technique of pixel shifting is not limited to a consistent shift for each of the pixels as described above. For example, in steps S110 to S150, a different technique may be used, such as generating the second image data DI2 by enlarging one portion of the first image data DI1 while reducing a corresponding second portion of the first image data DI1. For instance, the image converter 152-1 may determine an X-axis scaling ratio and a Y-axis scaling ratio for the enlarged region.

The enlarged region may represent a region (such as a square or rectangular region) of the pixels that is moved to a corresponding larger region, such as a square or rectangular region having twice (or some multiple such as the scaling ratio) the number of pixels in each dimension. Accordingly, the first image data DI1 corresponding to a first region (before enlarging) of the display panel may be mapped to a much larger set of second image data DI2 corresponding to a second region (after enlarging) of the display panel (using image processing techniques such as image data interpolation as would be apparent to one of ordinary skill).

For example, the image converter 152-1 may determine the X-axis scaling ratio and the Y-axis scaling ratio based on factors such as the frequency of pixel shifting, how much distortion of the displayed image is acceptable after the pixel shifting, etc. Further, the scaling may be done in units of frames, as delineated by the vertical synchronization signal of the control signals CS.

The image converter 152-1 may divide the X-axis of the first image data DI1 into an X-axis enlarged region and an X-axis reduced region based on factors such as the X-axis starting coordinate (e.g., where the region to be enlarged begins), the X-axis shift direction (e.g., in what direction the enlargement of the region takes place), and the X-axis scaling ratio amount (e.g., how much enlargement of the region) (S110).

According to an embodiment, the image converter 152-1 may determine an X-axis enlarged region by setting the length and position of the X-axis enlarged region. For example, the length of the X-axis enlarged region may be obtained by multiplying the length in the X-axis direction of the region before enlarging by the X-axis scaling ratio, and the position of the X-axis enlarged region may be determined based on the X-axis shift direction. The remaining region of the X-axis of the first image data DI1, except for the X-axis enlarged region, may be determined to be the X-axis reduced region, and its image data compressed (e.g., uniformly compressed using, for example, image data averaging, as would be apparent to one of ordinary skill) as needed to fit in the remaining portions of the display panel 160.

The image converter 152-1 may divide the Y-axis of the first image data DI1 into a Y-axis enlarged region and a Y-axis reduced region based on factors such as the Y-axis starting coordinate (e.g., where the region to be enlarged begins), the Y-axis shift direction (e.g., in what direction the enlargement of the region takes place), and the Y-axis scaling ratio (e.g., how much enlargement of the region) (S120).

According to an embodiment, the image converter 152-1 may determine the Y-axis enlarged region by setting the length and position of the Y-axis enlarged region. For example, the image converter 152-1 may obtain the length of the Y-axis enlarged region by multiplying the length in the Y-axis direction of the region before enlarging by the Y-axis scaling ratio, and the position of the Y-axis enlarged region may be determined based on the Y-axis shift direction. The remaining region of the Y-axis of the first image data DI1, except for the Y-axis enlarged region, may be determined to be the Y-axis reduced region, and its image data compressed (e.g., uniformly compressed using, for example, image data averaging, as would be apparent to one of ordinary skill) as needed to fit in the remaining portions of the display panel 160.

The image converter 152-1 may generate an X-coordinate and a Y-coordinate as well as their corresponding image data of the first image data DI1 to realize the first image data DI1 (S130). For example, the image converter 152-1 may generate the X-coordinate and the Y-coordinate as well as their corresponding image data of the first image data DI1 by using the first image data DI1 and the control signals CS (e.g., one or more of a vertical synchronization signal, a horizontal synchronization signal, a data enable signal, and a clock signal) received from the processor 110.

The image converter 152-1 may calculate a converted X-coordinate according to whether the X-coordinate of the first image data DI1 is located in the X-axis enlarged region or the X-axis reduced region (S140). In addition, the image converter 152-1 may calculate a converted Y-coordinate according to whether the Y-coordinate of the first image data DI1 is located in the Y-axis enlarged region or the Y-axis reduced region (S150).

The image converter 152-1 may generate the second image data DI2 by mapping the first image data DI1 to converted coordinates including the converted X-coordinate and the converted Y-coordinate (S160), doing appropriate image processing techniques (e.g., interpolation or averaging of image data, as would be apparent to one of ordinary skill) to compensate for the different pixel resolutions in the reduced and enlarged regions in the second image (after remapping) versus the normal-sized regions in the first image (before remapping).

Figure 5:
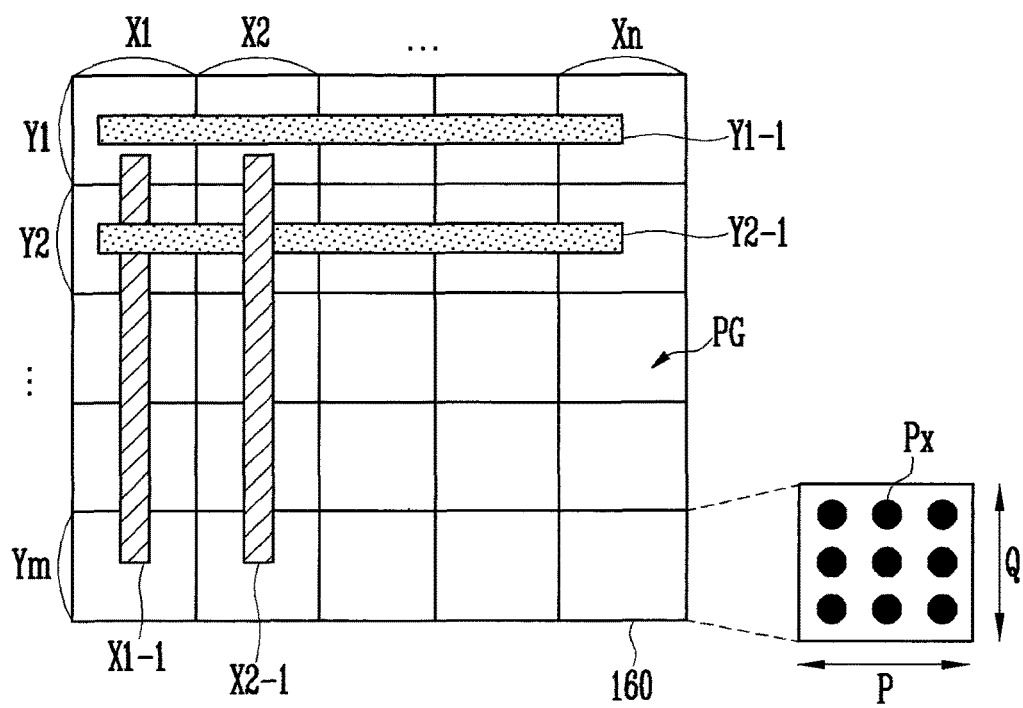
FIG. 5 is a conceptual view illustrating an example method of dividing a plurality of pixels of the display panel of FIG. 2 into pixel groups according to an embodiment of the present invention.

FIG. 5 is a conceptual view illustrating an example method of dividing a plurality of pixels Px of the display panel 160 of FIG. 2 into pixel groups PG according to an embodiment of the present invention.

For convenience of explanation, in FIG. 5, the display panel 160 may be divided into blocks, such as X-axis blocks X1-1, X2-1, . . . , and Xn−1 that correspond to X-axis touch coordinates X1, X2, . . . , and Xn (for example, the X-axis blocks and touch coordinates may correspond to X-axis touch sensor electrodes used to detect X-axis touch locations) and Y-axis blocks Y1-1, Y2-1, . . . , and Ym−1 that correspond to Y-axis touch coordinates Y1, Y2, . . . , and Ym (for example, the Y-axis blocks and touch coordinates may correspond to Y-axis touch sensor electrodes used to detect Y-axis touch locations) of pixel groups PG. For example, each block may represent those pixels in the display panel 160 that are associated with the corresponding touch sensor electrode or touch coordinate, while each pixel group may represent those pixels associated with a corresponding set of an X-axis touch coordinate and a Y-axis touch coordinate (e.g., a touch position).

The lookup table generator 152-2 may divide the plurality of pixels included in the display panel 160 into pixel groups PG based on the X-axis blocks and the Y-axis blocks. Each of the pixel groups PG may include at least one pixel Px. For example, when one pixel group PG includes P pixels Px in a horizontal (e.g., X-axis) direction and Q pixels Px in a vertical (e.g., Y-axis) direction, each of the pixel groups PG may include P×Q pixels Px. Further, if the display panel 160 includes N pixels Px, then there would be N/P×Q pixel groups PG.

The lookup table generator 152-2 may assign a corresponding X-axis touch coordinate and a corresponding Y-axis touch coordinate to each of the pixel groups PG, and may generate a pixel group table PGT including information about X-axis touch coordinates and Y-axis touch coordinates (for example, their relationship to X-axis image coordinates and Y-axis image coordinates, respectively). An example pixel group table PGT will be described in further detail with reference to FIG. 7.

The lookup table generator 152-2 may generate X-axis touch coordinates X1, X2, . . . , and Xn of the pixel groups PG in a direction from left to right of the display panel 160 and Y-axis touch coordinates Y1, Y2, . . . , and Ym of the pixel groups PG in a direction from top to bottom of the display panel 160. For example, the X-axis touch coordinate of the pixel group PG corresponding to the first X-axis block X1-1 may be the touch coordinate X1 and the X-axis touch coordinate of the pixel group PG corresponding to the second X-axis block X2-1 may be the touch coordinate X2.

In addition, the Y-axis touch coordinate of the pixel group PG corresponding to the first Y-axis block Y1-1 may be the touch coordinate Y1 and the Y-axis touch coordinate of the pixel group PG corresponding to the second Y-axis block Y2-1 may be the touch coordinate Y2.

However, the above-described method of setting the X-axis touch coordinate and the Y-axis touch coordinate is shown only for convenience of explanation. In other embodiments, the specifications for setting the X-axis touch coordinate and the Y-axis touch coordinate may vary.

Figure 6:
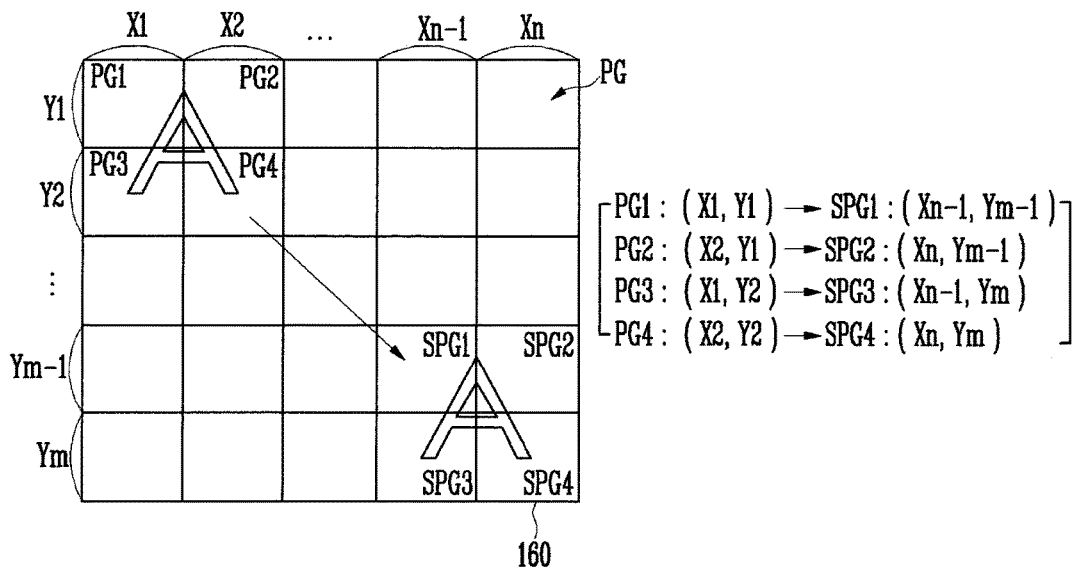
FIG. 6 is a conceptual view illustrating an example method of changing a touch position of the display panel of FIG. 2 according to changes in corresponding image data using the pixel groups of FIG. 5 according to an embodiment of the present invention.

FIG. 6 is a conceptual view illustrating an example method of changing a touch position of the display panel 160 of FIG. 2 according to changes in corresponding image data using the pixel groups PG of FIG. 5 according to an embodiment of the present invention.

Referring to FIG. 6, an image of an alphabetic 'A' displayed on the first pixel groups PG1, PG2, PG3, and PG4 of the display panel 160 may be an image displayed based on the first image data DI1, and an image of the alphabetic 'A' displayed on the corresponding second pixel groups SPG1, SPG2, SPG3, and SPG4 of the display panel 160 may be an image displayed based on the second image data DI2. For example, the second image data DI2 may shift an image in the upper left corner of the display panel 160 to the lower right corner of the display panel 160.

The touch positions of the first pixel groups PG1, PG2, PG3, and PG4 at which the first image data DI1 is displayed may be referred to as a first touch position (e.g., before pixel shifting), and the touch positions of the second pixel groups SPG1, SPG2, SPG3, and SPG4 at which the second image data DI2 is displayed may be referred to as a second touch position (e.g., after pixel shifting). For example, the first touch position may include touch coordinates (X1, Y1), (X2, Y1), (X1, Y2), and (X2, Y2), while the second touch position may include touch coordinates (Xn−1, Ym−1), (Xn, Ym−1), (Xn−1, Ym), and (Xn, Ym).

The image converter 152-1 may convert the first image data DI1 to the second image data DI2 by performing a pixel shift operation. When the first image data DI1 is converted to the second image data DI2, the movement of the touch positions corresponding to each image data is accompanied with the pixel shift operation in the form of a lookup table LUT. For ease of description and implementation, the pixel shift operation and the lookup table LUT may be defined in units of the pixel groups PG and their corresponding touch positions.

For example, when the first image data DI1 is converted to the second image data DI2 by the image converter 152-1, the same operation (only in reverse) may be performed on the second touch position to convert the second touch position back to a corresponding first touch position before conversion of the first image data DI1. To accomplish this, the lookup table generator 152-2 may generate the lookup table LUT mapping touch coordinates corresponding to the second touch positions to their corresponding touch coordinates corresponding to the first touch positions. An example lookup table LUT including the touch coordinates corresponding to the second and first touch positions will be described below in further detail with reference to FIG. 8.

Figure 7:
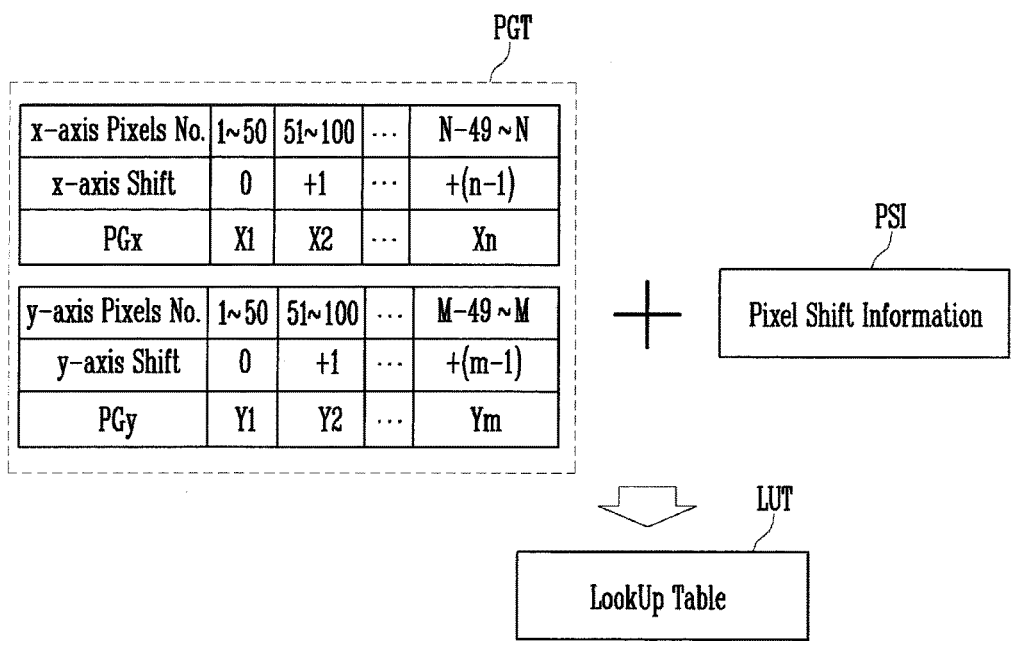
FIG. 7 is a conceptual view illustrating an example method of generating a lookup table using the pixel groups of FIG. 5 according to an embodiment of the present invention.

FIG. 7 is a conceptual view illustrating an example method of generating the lookup table LUT using the pixel groups PG of FIG. 5 according to an embodiment of the present invention.

Referring to FIG. 7, the lookup table generator 152-2 may generate the lookup table LUT by using, for example, the pixel group table PGT and the pixel shift information PSI. The pixel group table PGT may include a first table (e.g., an upper table as depicted in FIG. 7) and a second table (e.g., a lower table as depicted in FIG. 7). For example, the first table may include the range of X-axis pixel numbers ("x-axis Pixels No." in FIG. 7, such as a pixel column number range), an x-axis shift number (e.g., a number of pixel groups PG shifted to the right of the leftmost pixel group PG), and an X-axis touch coordinate PGx of each pixel group, ranging from X1 to Xn, while the second table may include the range of y-axis pixel numbers ("y-axis Pixels No." in FIG. 7, such as a pixel row number range), a y-axis shift number (e.g., a number of pixel groups PG shifted below the topmost pixel group PG), and a Y-axis touch coordinate PGy of each pixel group, ranging from Y1 to Ym.

Referring to FIG. 6, the lookup table generator 152-2 may assign the plurality of pixels of the display panel 160 to pixel groups PG. Each of the pixel groups PG may be represented by an X-axis touch coordinate and a Y-axis touch coordinate. The lookup table generator 152-2 may group a square or rectangular region including a set or predetermined number of pixels arranged in the X-axis direction (e.g., a horizontal axis direction of the display panel 160) and a set or predetermined number of pixels arranged in the Y-axis direction (e.g., a vertical axis direction of the display panel 160) to a pixel group PG, repeating this grouping for the entire display panel 160, and set the same X-axis touch coordinate to all the pixel groups PG sharing the same column and the same Y-axis touch coordinate to all the pixel groups PG sharing the same row.

For example, the lookup table generator 152-2 may group the pixels of the display panel into square or rectangular pixel groups PG each including fifty pixels in the X-axis direction and fifty pixels in the Y-axis direction (e.g., 50×50=2500 pixels in each pixel group PG). The lookup table generator may assign the first X-axis touch coordinate X1 to the leftmost pixel groups PG, the second X-axis touch coordinate X2 to the next-to-leftmost pixel groups PG, etc., and may assign the first Y-axis touch coordinate Y1 to the topmost pixel groups PG, the second Y-axis touch coordinate Y2 to the next-to-topmost pixel groups PG, etc. Continuing in this fashion, the lookup table generator 152-2 may generate the X-axis touch coordinate and the Y-axis touch coordinate for each pixel group PG.

Referring again to FIG. 7, the lookup table generator 152-2 may correlate X-axis touch coordinates and Y-axis touch coordinates to corresponding pixel groups by using the pixel group table PGT. The lookup table generator 152-2 may generate the lookup table LUT by using the pixel group table PGT and the pixel shift information PSI. For example, the lookup table generator 152-2 may generate the lookup table LUT by dividing the pixels of the display panel 160 into corresponding pixel groups PG using the pixel group table PGT, and for each pixel group PG, calculating an X-axis shift and a Y-axis shift for the pixel group PG using the pixel shift information PSI, and storing the corresponding touch coordinates of each pixel group both before and after pixel shifting in the lookup table LUT.

Figures 8, 9:
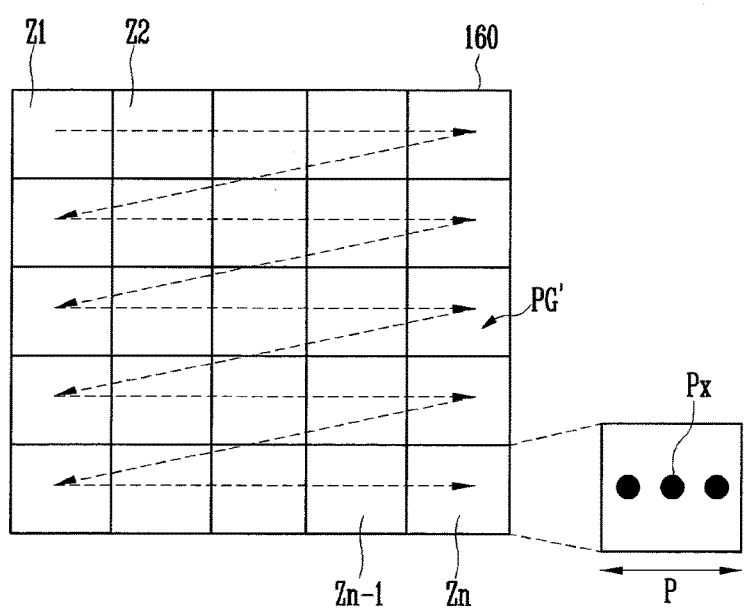
FIG. 8 is a conceptual view of an example lookup table of FIG. 7 according to an embodiment of the present invention.
FIG. 9 is a conceptual view illustrating an example method of dividing the plurality of pixels of the display panel of FIG. 2 into pixel groups according to another embodiment of the present invention.

FIG. 8 is a conceptual view of an example lookup table LUT of FIG. 7 according to an embodiment of the present invention.

Referring to FIG. 8, the lookup table generator 152-2 may generate the lookup table LUT including the first pixel groups PG1, PG2, PG3, PG4, . . . displaying the first image data DI1, the first touch positions (X1, Y1), (X2, Y1), (X1, Y2), (X2, Y2), . . . corresponding to the first pixel groups, together with the corresponding second pixel groups SPG1, SPG2, SPG3, SPG4, . . . displaying the second image data DI2, and the second touch positions (Xn−1, Ym−1), (Xn, Ym−1), (Xn−1, Ym), (Xn, Ym), . . . corresponding to the second pixel groups.

For example, the first pixel group PG1 displaying the first image data DI1 may be set to the first touch coordinates (X1, Y1), and the corresponding second pixel group SPG1 converted from the first pixel group PG1 to display the second image data DI2 may be set to the second touch coordinates (Xn−1, Ym−1). In a similar fashion, the first pixel group PG2 may be set to the first touch coordinates (X2, Y1) and the corresponding second pixel group SPG2 converted from the first pixel group PG2 may be set to the second touch coordinates (Xn, Ym−1), the first pixel group PG3 may be set to the first touch coordinates (X1, Y2) and the corresponding second pixel group SPG3 converted from the first pixel group PG3 may be set to the second touch coordinates (Xn−1, Ym), and the first pixel group PG4 may be set to the first touch coordinates (X2, Y2) and the corresponding second pixel group SPG4 converted from the first pixel group PG4 may be set to the second touch coordinates (Xn, Ym).

The lookup table LUT may be built in any number of ways, as would be apparent to one of ordinary skill. For example, in one embodiment, the entries of the first pixel groups and their corresponding second pixel groups may be built as illustrated in FIG. 8, and then the rows of the lookup table LUT may be sorted or indexed by the second pixel groups or touch positions to improve the lookup efficiency. In another embodiment, the lookup table may be arranged by second pixel groups or touch positions, and the corresponding first pixel groups or touch positions filled in as the different mappings from first pixel groups or touch positions to second pixel groups or touch positions are determined. In yet another embodiment, an inverse operation mapping the second pixel groups or touch positions back to their corresponding first pixel groups or touch positions may be used to build the lookup table LUT.

As described above with reference to FIG. 3, the touch position corrector 110-1 of the processor 110 may correct the touch coordinates of the second image data DI2 (e.g., second touch positions) to corresponding touch coordinates of the first image data DI1 (e.g., first touch positions) using the entries included in the lookup table LUT.

For example, by using the lookup table LUT, the processor 110 may correct the touch coordinates of the second image data DI2 displayed on the second pixel group SPG1 from the second touch coordinates (Xn−1, Ym−1) to the first touch coordinates (X1, Y1), the touch coordinates of the second image data DI2 displayed on the second pixel group SPG2 from the second touch coordinate (Xn, Ym−1) to the first touch coordinates (X2, Y1), the touch coordinates of the second image data DI2 displayed on the second pixel group SPG3 from the second touch coordinates (Xn−1, Ym) to the first touch coordinates (X1, Y2), and the touch coordinates of the second image data DI2 displayed on the second pixel group SPG4 from the second touch coordinates (Xn, Ym) to the first touch coordinates (X2, Y2).

Therefore, even when an image is converted by a pixel shift operation, the details of which the processor 110 may be unaware of, the processor 110 may still correct a touch position from the actual touch position (e.g., after shifting) where the image is displayed to the intended touch position (e.g., before shifting) by using the lookup table LUT. In addition, the processor 110 may accurately correct the touch position without complicated arithmetic operations since only the touch coordinates of the second image data DI2 need be indexed using the lookup table LUT to determine the corresponding intended touch coordinates of the first image data DI1.

FIG. 9 is a conceptual view illustrating an example method of dividing the plurality of pixels Px of the display panel 160 of FIG. 2 into pixel groups PG' according to another embodiment of the present invention.

Referring to FIG. 9, the lookup table generator 152-2 may arrange a plurality of pixels included in the display panel 160 into pixel groups PG'. For example, the lookup table generator 152-2 may generate the pixel groups PG' each including a plurality of pixels arranged in a sequential manner. Each of the pixel groups PG' may include at least one pixel Px. For example, when P pixels are arranged in each pixel group PG' in a horizontal direction (e.g., row major order), each of the pixel groups PG' may include P pixels in the horizontal direction (and one pixel in the vertical direction). If the display panel 160 includes N pixels, there would be N/P pixel groups PG'.

According to an embodiment as illustrated in FIG. 9, the lookup table generator 152-2 may divide a plurality of pixels arranged in a pixel row sequentially in the direction of the arrow (e.g., row major order) from the upper left of the display panel 160 by a set or predetermined number P of pixels for each pixel group PG' (e.g., starting with pixel group Z1, then pixel group Z2, etc.), and the pixel groups PG' may each include P pixels. Further, after completing each pixel row, the dividing may continue in a similar fashion in the next pixel row until all of the pixel rows are divided into pixel groups PG' of P pixels each (e.g., finishing with pixel group Zn−1 and then pixel group Zn in the lower right of the display panel 160).

For convenience of explanation, FIG. 9 illustrates a method of generating the pixel groups PG' sequentially in the direction of the arrow (e.g., row major order). However, the direction in which the pixel groups PG' are generated may be changed according to various methods, such as a column major order (e.g., sequentially assigning all of the pixels from each pixel column into, for example, Q pixels for each pixel group PG', and continuing the process for each pixel column).

The numbers P and Q may represent, for example, the number of pixels in the X-axis direction corresponding to each of the X-axis touch electrodes or the number of pixels in the Y-axis direction corresponding to each of the Y-axis touch electrodes, respectively. In addition, the lookup table generator 152-2 may generate a pixel group table PGT' including information about the pixel groups PG'. An example pixel group table PGT' will be described in further detail with reference to FIG. 11.

Figure 10:
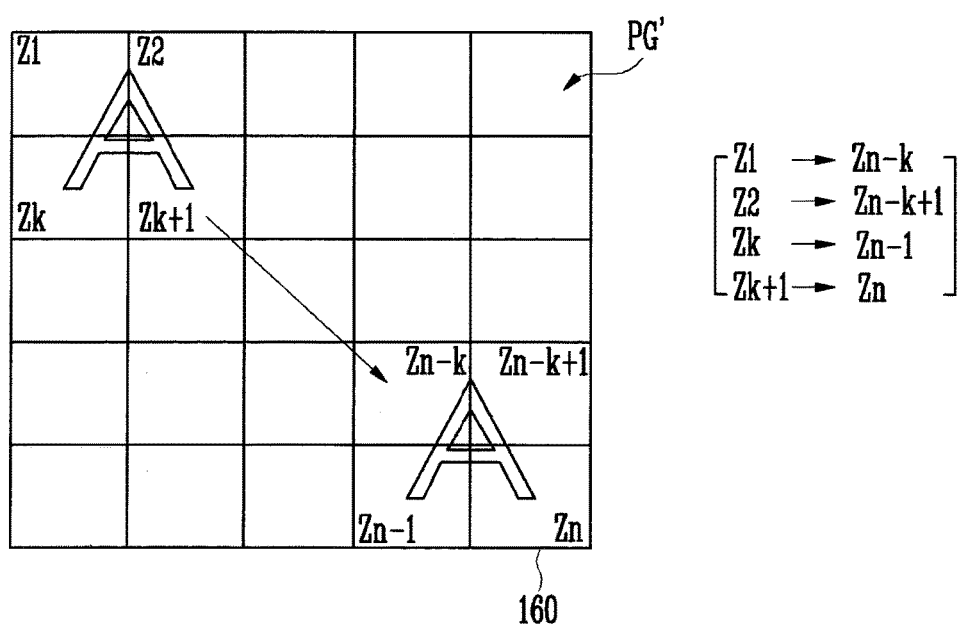
FIG. 10 is a conceptual view illustrating an example method of changing a touch position of the display panel of FIG. 2 according to changes in corresponding image data using the pixel groups of FIG. 9 according to an embodiment of the present invention.

FIG. 10 is a conceptual view illustrating an example method of changing a touch position of the display panel 160 of FIG. 2 according to changes in corresponding image data using the pixel groups PG' of FIG. 9 according to an embodiment of the present invention.

Referring to FIG. 10, an image of an alphabetic 'A' may be displayed on the first pixel groups Z1, Z2, . . . , Zk, and Zk+1 based on the first image data DI1, and an image of the alphabetic 'A' may be displayed on the corresponding second pixel groups Zn−k, Zn−k+1, . . . , Zn−1, and Zn based on the second image data DI2. The touch positions of the first pixel groups Z1, Z2, . . . , Zk, and Zk+1 where the first image data DI1 is displayed may be referred to as a first touch position, and the touch positions of the second pixel groups Zn−k, Zn−k+1, . . . , Zn−1, and Zn where the second image data DI2 is displayed may be referred to as a second touch position.

The image converter 152-1 may convert the first image data DI1 to the second image data DI2 by performing a pixel shift operation. When the first image data DI1 is converted to the second image data DI2, the corresponding conversion of the first touch position (e.g., before shifting) to the second touch position (e.g., after shifting) for the corresponding second image data is generated and added to the lookup table LUT'.

When the image converter 152-1 converts the first image data DI1 to the second image data DI2, the same operation (only in reverse) may be performed for the corresponding touch positions when the user touches the second touch position (e.g., after shifting) and the sensed (second) touch position needs to be corrected to the first touch position (e.g., before shifting). Therefore, the lookup table generator 152-2 may generate the lookup table LUT' including touch positions corresponding to the second touch positions and their associated touch positions corresponding to the first touch positions. An example lookup table LUT' including the touch positions corresponding to the second and first touch positions will be described in further detail with reference to FIG. 12.

Figures 11, 12:
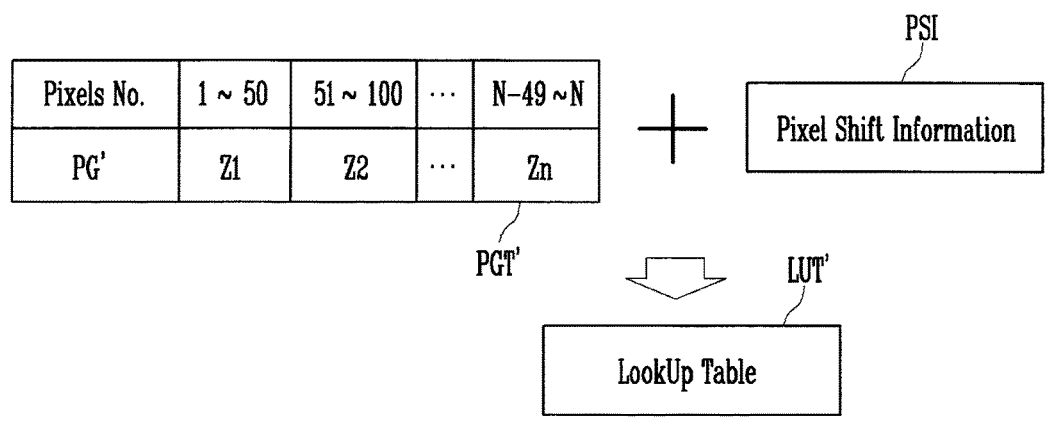
FIG. 11 is a conceptual view illustrating an example method of generating a lookup table using the pixel groups of FIG. 9 according to an embodiment of the present invention.
FIG. 12 is a conceptual view of an example lookup table of FIG. 11 according to an embodiment of the present invention.

FIG. 11 is a conceptual view illustrating an example method of generating the lookup table LUT' using the pixel groups PG' of FIG. 9 according to an embodiment of the present invention.

Referring to FIG. 11, the lookup table generator 152-2 may generate the lookup table LUT' by using the pixel group table PGT' and the pixel shift information PSI. The pixel group table PGT' may include the pixel number range ("Pixels No." in FIG. 11) and the corresponding pixel group coordinate PGx of the pixel group PG'. For example, the display panel 160 may include N pixels Px, numbered from 1 to N in row major order (FIG. 9 illustrates an example row major ordering), the first pixel group PG1 including pixels 1-50, the second pixel group PG2 including pixels 51-100, . . . , and the n-th pixel group PGn including pixels N-49 through N.

Referring to FIG. 9, the lookup table generator 152-2 may assign the plurality of pixels Px into the pixel groups PG'. Each of the pixel groups Z1, Z2, . . . , Zn−1, and Zn may include a set or predetermined number P of pixels Px arranged sequentially in the direction of the arrow (e.g., row major order). Since the pixel groups Z1, Z2, . . . , Zn−1, and Zn may be assigned or generated sequentially in the direction of the arrow (e.g., row major order), it may be possible to check the positional relationship of the pixel groups according to the order that the pixel group table PGT' is generated by the lookup table generator 152-2. For example, similar pixel shift operations may be separated by the same number of entries in the pixel group table PGT'.

For example, when the first pixel group Z1 and the n-th pixel group Zn are compared against each other based on the direction of the arrow (e.g., row major order), the n-th pixel group Zn may be generated as the (n−1)-th pixel group after the first pixel group Z1. Therefore, the lookup table generator 152-2 may generate or store the entry for the n-th pixel group Zn in the pixel group table PGT' n−1 entries after the entry for the first pixel group Z1. In this fashion, the order in which the pixel groups PG' are generated or store may provide the positional relationship between the pixel groups PG' (such as the row major order).

Referring again to FIG. 11, the lookup table generator 152-2 may use the positional relationship between the respective pixels Px by using the pixel groups Z1, Z2, . . . , Zn−1, and Zn included in the pixel group table PGT', or the positional relationship between the pixel groups PG' including the plurality of pixels Px as laid out in the display panel 160 (e.g., row major order).

The lookup table generator 152-2 may generate the lookup table LUT by using the pixel group table PGT' and the pixel shift information PSI transmitted from the image converter 152-1. For example, the pixel shift information PSI may include the distance and direction by which an image is converted from the first image data DI1 to the second image data DI2.

The lookup table generator 152-2 may check the positional relationship between the pixel groups by using the pixel group table PGT' and determine a touch position shift amount of each pixel group PG' by using the pixel shift information PSI. Therefore, the lookup table generator 152-2 may generate the lookup table LUT' with respect to the positional relationship between the pixel groups PG' and the shift of the touch position of each pixel group PG'.

FIG. 12 is a conceptual view of an example lookup table LUT' of FIG. 11 according to an embodiment of the present invention.

Referring to FIGS. 9, 10 and 12, the lookup table generator 152-2 may generate the lookup table LUT' including the first pixel groups Z1, Z2, . . . , Zk, and Zk+1 displaying the first image data DI1 and the second pixel groups Zn−k, Zn−k+1, . . . , Zn−1, and Zn displaying the second image data DI2. Since each of the pixel groups Z1, Z2, . . . , Zn−1, and Zn includes the pixels arranged sequentially in the direction of the arrow (e.g., row major order), the lookup table generator 152-2 may check the positional relationship between the pixels Px included in each of the pixel groups Z1, Z2, . . . , Zn−1, and Zn according to the order of the pixel groups Z1, Z2, . . . , Zn−1, and Zn in the pixel group table PGT'.

For example, when the first image data DI1 is converted to the second image data DI2, the touch position of the first pixel group Z1 displaying the first image data DI1 may be converted to the touch position of the second pixel group Zn−k displaying the second image data DI2. Since the second pixel group Zn−k is moved n−k−1 times in the direction of the arrow from the first pixel group Z1, the touch position of the second pixel group Zn−k may refer to the position at which the second pixel group Zn−k is moved n−k−1 times from the touch position of the first pixel group Z1 in the direction of the arrow (e.g., row major order).

In a similar fashion, when the first image data DI1 is converted to the image data DI2, the touch position of the first pixel group Z2 displaying the first image data DI1 may be converted to the touch position of the second pixel group Zn−k+1 displaying the second image data DI2 by the same movement of n−k−1 times in row major order. The same movement of n−k−1 times in row major order may be carried out for each of the other first pixel groups of the first touch position up through first pixel groups Zk and Zk+1, ending up at corresponding second pixel groups of the second touch position (through second pixel groups Zn−1 and Zn). The lookup table LUT' may also be built, sorted, or indexed by second pixel group using similar techniques to those described above to build the lookup table LUT.

As described above with reference to FIG. 3, the touch position corrector 110-1 of the processor 110 may correct the touch position of the second pixel group displaying the second image data DI2 to the touch position of the first pixel group displaying the first image data DI1 by using the lookup table LUT'. The pixel groups Z1, Z2, . . . , Zn included in the lookup table LUT' may refer to the touch position of each pixel group according to the order of the pixel groups. The processor 110 may correct the touch positions of the second pixel groups Zn−k, Zn−k+1, . . . , Zn−1, Zn to their corresponding touch positions of the first pixel groups Z1, Z2, . . . , Zk, Zk+1.

For example, the processor 110 may correct the touch position of the second pixel group Zn−k to the touch position of the first pixel group Z1 by using the lookup table LUT', as well as correct the touch position of the second pixel group Zn−k+1 to the touch position of the first pixel group Z2, the touch position of the second pixel group Zn−1 to the touch position of the first pixel group Zk, and the touch position of the second pixel group Zn to the touch position of the first pixel group Zk+1.

Therefore, even when an intended image is converted by a pixel shift operation by the image controller 152 to a different actual image (and that the processor 110 is unaware of), the processor 110 may correct an actual touch position based on the actual image to the corresponding intended touch position based on the intended image (and that the processor is aware of) by using the lookup table LUT'. In addition, since the processor 110 corrects only the touch coordinates of the second image data DI2 by using the lookup table LUT', the touch position may be quickly and accurately corrected without separate complicated arithmetic operations.

Figure 13:
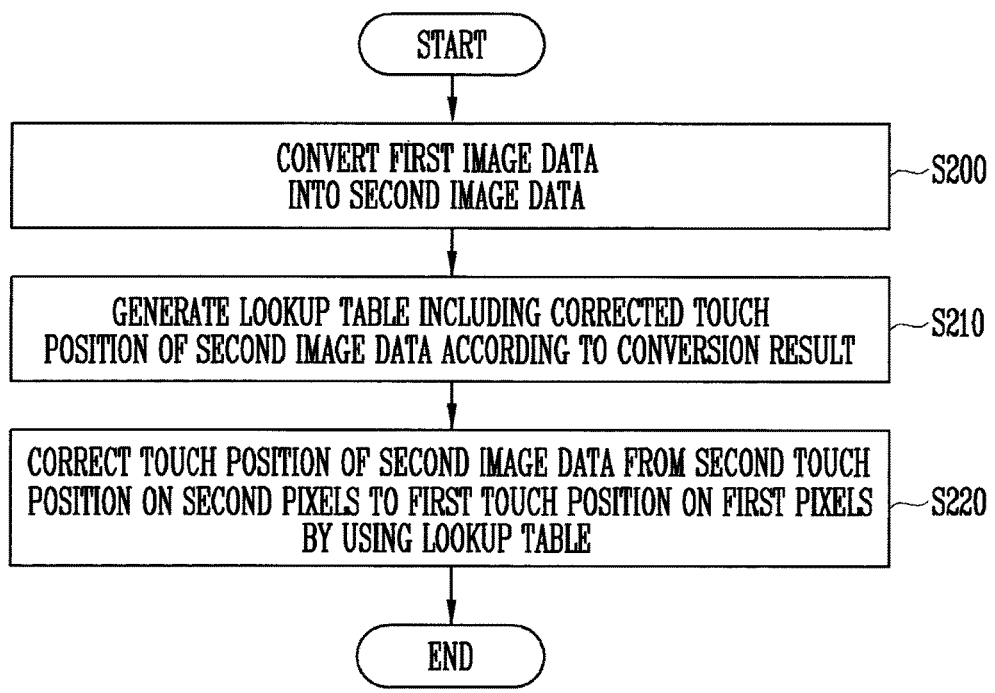
FIG. 13 is a flowchart illustrating an example method of driving a touch screen display device that corrects a touch position by using a lookup table according to an embodiment of the present invention.

FIG. 13 is a flowchart illustrating an example driving method of a touch screen display device that corrects a touch position by using a lookup table according to an embodiment of the present invention.

Referring to FIG. 13, the image converter 152-1 may convert the first image data DI1 (e.g., before pixel shifting) to the second image data DI2 (e.g., after pixel shifting) (S200). The lookup table generator 152-2 may generate the lookup table LUT including the corrected touch positions of the second image data DI2 and the corresponding intended touch positions of the first image data DI1 according to a result of the conversion (e.g., applying the reverse of the pixel shifting technique to the different touch positions of the display panel 160) (S210).

The touch position corrector 110-1 may correct the touch position of the second image data DI2 from the second touch positions of second pixels (e.g., actual touch positions, as touched by a user observing an image that has undergone pixel shifting) to the corresponding first touch positions of first pixels by using the lookup table LUT (S220).

In a touch screen display device and a driving method thereof according to embodiments of the present invention, an actually detected touch position may be corrected to intended touch position coordinates reflecting a pixel shift amount by using a lookup table, so that an accurate touch position according to a user's indented touch operation may be detected. In addition, in a touch screen display device and a driving method thereof according to embodiments of the present invention, a processor may change an actual touch position to an intended touch position according to touch position coordinates included in a lookup table, so that delay time and other complications may be avoided.

Example embodiments of the present invention have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and equivalents thereof.

What is claimed is:

1. A touch screen display device comprising:
    an image corrector for converting first image data for displaying on pixels to second image data for displaying on the pixels, and for generating a lookup table based on the conversion, the lookup table comprising first touch positions of the first image data and corresponding second touch positions of the second image data, wherein the image corrector comprises an image converter configured to generate from an X-coordinate and a Y-coordinate with respect to the first image data a converted X-coordinate and a converted Y-coordinate of the second image data by converting the X-coordinate and the Y-coordinate in response to one or more control signals, and calculate an X-axis shift amount between the X-coordinate and the converted X-coordinate and a Y-axis shift amount between the Y-coordinate and the converted Y-coordinate; and
    a processor for correcting each of the second touch positions of the second image data to be at their corresponding first touch positions of the first image data by mapping each of the second touch positions of the second image data to their corresponding first touch positions of the first image data using the lookup table.

2. The touch screen display device according to claim 1, wherein the image corrector comprises:
    the image converter for converting the first image data to the second image data by using the one or more control signals received from the processor and for generating pixel shift information relating the second image data to the first image data; and
    a lookup table generator for defining positional relationships between the first touch positions and the second touch positions by using the pixel shift information and for generating a lookup table according to the defined positional relationships.

3. The touch screen display device according to claim 2, wherein the pixel shift information comprises the X-axis shift amount and the Y-axis shift amount.

4. The touch screen display device according to claim 2, wherein the lookup table generator is configured to divide the pixels in a sequential manner into pixel groups each including at least one pixel.

5. The touch screen display device according to claim 4, wherein the lookup table generator is further configured to:
    divide the pixels into X-axis pixel groups in a horizontal direction and into Y-axis pixel groups in a vertical direction, each including at least one pixel; and
    generate X-axis touch coordinates and Y-axis touch coordinates corresponding to the X-axis pixel groups and the Y-axis pixel groups, respectively,
    wherein the first touch positions and the second touch positions each comprise one of the X-axis touch coordinates and one of the Y-axis touch coordinates.

6. The touch screen display device according to claim 4, wherein the lookup table generator is further configured to divide the pixels sequentially into the pixel groups in a first direction and to define an ordering of the pixel groups according to a sequential division order.

7. The touch screen display device according to claim 6, wherein the first direction is one of a row major order and a column major order on a display panel.

8. The touch screen display device according to claim 2, wherein the lookup table generator is configured to:
    generate first pixel groups corresponding to the first image data and second pixel groups corresponding to the second image data; and
    set touch positions of the first pixel groups to the first touch positions and touch positions of the second pixel groups to the second touch positions.

9. The touch screen display device according to claim 8, wherein the lookup table is configured to associate the first pixel groups to the first touch positions and the second pixel groups to the second touch positions on a display panel.

10. The touch screen display device according to claim 1, wherein the image corrector is configured to generate the lookup table whenever the conversion between the first image data and the second image data changes.

11. The touch screen display device according to claim 1, wherein the image corrector is configured to generate the lookup table periodically.

12. A method of driving a touch screen display device, the method comprising:
    converting first image data for displaying on pixels to second image data for displaying on the pixels;
    generating a lookup table based on the conversion, the lookup table comprising first touch positions of the first image data and corresponding second touch positions of the second image data; and
    correcting each of the second touch positions of the second image data to be at their corresponding first touch positions of the first image data by mapping each of the second touch positions of the second image data to their corresponding first touch positions of the first image data using the lookup table, wherein the converting of the first image data comprises:
    generating from an X-coordinate and a Y-coordinate with respect to the first image data a converted X-coordinate and a converted Y-coordinate of the second image data by converting the X-coordinate and the Y-coordinate in response to one or more control signals; and
    generating the second image data by mapping the first image data to converted coordinates comprising the converted X-coordinate and the converted Y-coordinate.

13. The method of claim 12, wherein
    the converting of the second image data comprises:
        dividing the pixels in a sequential manner into pixel groups each including at least one pixel; and
        assigning the first and second touch positions to the pixel groups, and
    the lookup table comprises the first and second touch positions assigned to the pixel groups.

14. The method of claim 13, wherein the dividing of the pixels comprises dividing the pixels horizontally into X-axis pixel groups and vertically into Y-axis pixel groups on a display panel, and classifying pixel groups commonly included in the X-axis pixel groups and the Y-axis pixel groups.

15. The method of claim 14, wherein the assigning of the first and second touch positions comprises assigning X-axis touch coordinates and Y-axis touch coordinates corresponding to the X-axis pixel groups and the Y-axis pixel groups, respectively, and the classifying of the pixel groups comprises classifying the pixel groups by using the X-axis touch coordinates and the Y-axis touch coordinates.

16. The method of claim 13, wherein the dividing of the pixels comprises dividing the pixels in one of a row major order and a column major order on a display panel into the pixel groups.

17. The method of claim 13, wherein the generating of the lookup table comprises:
  generating first pixel groups corresponding to the first touch positions and second pixel groups corresponding to the second touch positions; and
  setting touch positions of the first pixel groups to the first touch positions and setting touch positions of the second pixel groups to the second touch positions to generate the lookup table.

18. The method of claim 17, wherein the lookup table is configured to associate the first pixel groups to the first touch positions and the second pixel groups to the second touch positions on a display panel.

* * * * *